Aug. 23, 1932.    C. W. GREENWALD    1,872,733
SLIDABLE OVEN AND BROILER RACK
Filed Feb. 26, 1931
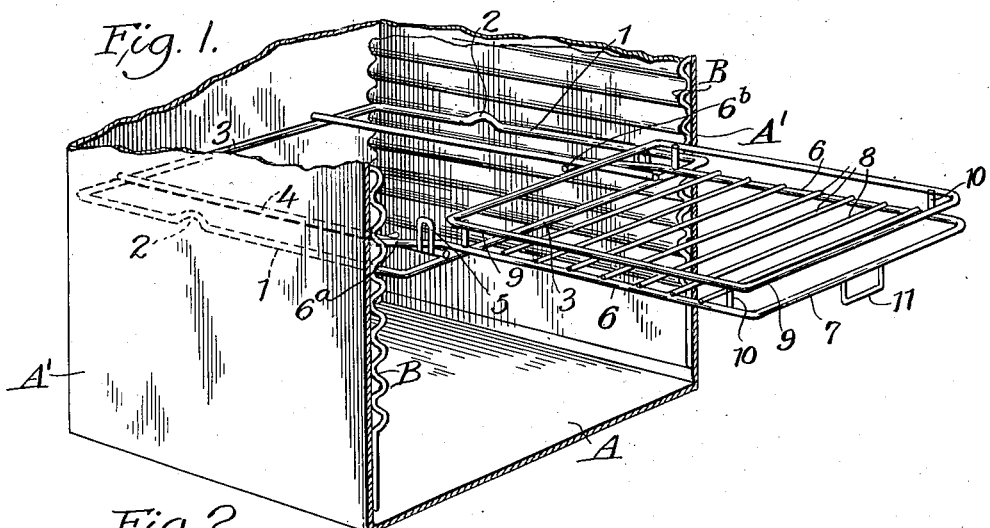
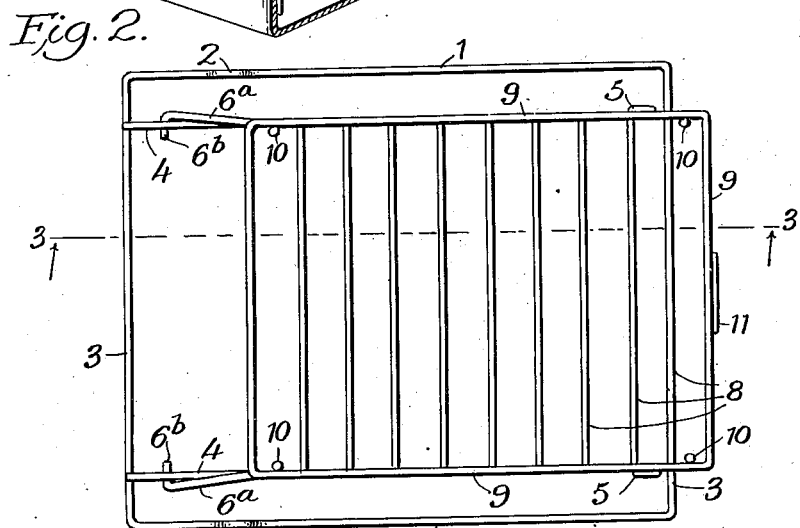
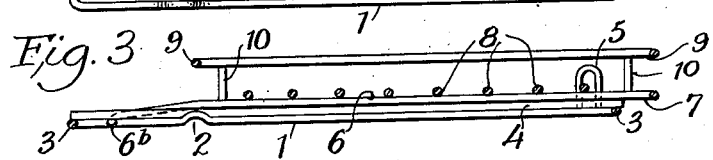
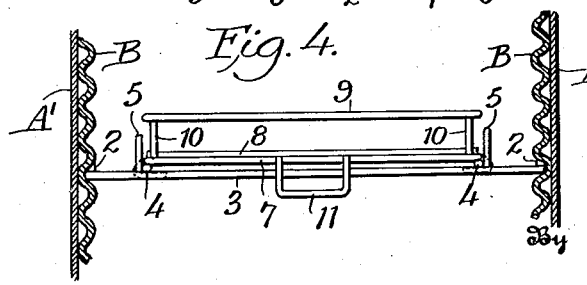

Patented Aug. 23, 1932

1,872,733

UNITED STATES PATENT OFFICE

COLON W. GREENWALD, OF OWOSSO, MICHIGAN, ASSIGNOR TO INDEPENDENT STOVE COMPANY, OF OWOSSO, MICHIGAN, A CORPORATION OF MICHIGAN

SLIDABLE OVEN AND BROILER RACK

Application filed February 26, 1931. Serial No. 518,537.

This invention relates to cooking ovens, broilers, and the like; and the principal object of the invention is to provide a novel improvement in oven or broiler racks made of stiff wire and embodying certain novel features of construction hereinafter set forth, the article carrying grill of the rack being readily slidable in and out of the hot oven or broiler so that the article thereon may be readily and safely withdrawn from the hot oven or broiler at any time for the purposes of removal or inspection during the broiling, baking, or other cooking process.

I will explain the invention with reference to the accompanying drawing which illustrates one practical embodiment thereof to enable others to adopt and use the same; and will summarize in the claims the novel features of construction, and novel combinations of parts, for which protection is desired.

In said drawing:

Fig. 1 is a perspective view of a broiler or oven, partly broken away, showing my novel rack in position therein with the slidable grill of the rack projected out of the front of the oven.

Fig. 2 is an enlarged plan view of the rack, detached.

Fig. 3 is a section on the line 3—3, Fig. 2.

Fig. 4 is a front elevation of the rack showing the adjacent portions of the oven walls.

My invention is illustrated in connection with a broiler or oven A, of any desired type, preferably open at its front, and having a door (not shown) for closing said open front. The side walls A' of the oven are provided with the usual series of grooves B for receiving and supporting the oven rack, or racks, at various elevations.

As shown, my novel rack preferably comprises a stationary base frame adapted to be supported by the grooves B on the side walls A' of the oven, said base frame carrying the slidable grill of the rack. The stationary base consists of a rectangular frame, formed of stiff wire, of dimensions to suit the interior length and width of the oven, the side members 1 of the frame being adapted to be supported as shown in Figs. 1 and 4 in the opposed grooves B on the sides of the oven. Preferably the side members 1 of the base frame are provided with offset portions 2, conveniently formed by bending the members, to cause the side members 1 to fit snugly within said grooves B whereby the base frame will fit snugly and be held firmly in the grooves. The ends of the side members 1 are connected by end members 3. Parallel with each side member 1 of the base frame is a rod 4 spaced inwardly from the side members the rods 4 having each end welded to the end members 3 of the frame, said rods 4, forming guides or tracks upon which the slidable grill of the rack is mounted. Adjacent the front ends of bars 4 are vertically disposed offset portions 5 adapted to form guides to engage the sides of the slidable grill and hold the slidable grill in axial alignment with the stationary base at all times; and portions 5 may conveniently comprise loops formed in the bars 4.

The slidable grill of the rack preferably comprises a U-shaped frame of stiff wire having side members 6 and front 7, said frame being of same width as the distance between the parallel bars 4 of the base, but of less length than the base. Welded to the side members 6 of the slidable grill are a plurality of cross bars 8 adapted to support a broiler pan or other cooking utensil during the process of broiling or baking. The rear ends of the side members 6 of the slidable grill extend beyond the innermost cross bar 8, and are flared slightly outwardly as at 6a to embrace the parallel bars 4, as shown in Fig. 2 and their extremities are bent downwardly and inwardly as at 6b to form hooks slidably underlying the bars 4 of the base, whereby when the members of the rack are assembled and the slidable grill projected beyond the front of the stationary base, as shown in Fig. 1, the hooked ends 6b of the side members 6 will maintain the extended grill in horizontal position.

Preferably a guard rail 9 is provided for the slidable grill, supported by uprights 10 welded to the side members 6 adjacent their ends, said guard rail 9 holding the contents of the grill in place; and a handle 11 is preferably welded to the front end 7 of the grill whereby the same may be moved in and out of the oven door, sliding upon the stationary base to permit removal or inspection of the contents of the grill during the broiling or baking process.

My novel rack is simple and efficient, and being fabricated entirely of wire may be easily cleaned; and the base frame and slidable grill may be readily separated by raising the outer end of the grill above the tops of the guides 5 and giving a slight twist thereto with respect to the base frame to disengage hooks 6b from bars 4.

I do not limit my invention to the exact form shown in the drawing, for obviously changes may be made therein within the scope of the claims.

I claim:

1. In combination with an oven having grooves in its inner side walls; a rack comprising a horizontal frame supported by the grooves, a member carried by the frame; a grill slidably mounted on the frame and adapted to be projected out of the oven when the latter is opened; and means for horizontally supporting the grill when projected.

2. In a combination as set forth in claim 1, means at the sides of the frame whereby the frame will snugly engage the grooves.

3. In a combination as set forth in claim 1, means for maintaining the grill in alignment with the frame.

4. In combination with an oven having grooves in its inner side walls; a rack comprising a horizontal wire frame supported by the grooves; parallel bars on the frame; a wire grill slidably mounted on the frame and adapted to be projected out of the oven when the latter is opened; and means on the grill engaging the parallel bars for horizontally supporting the grill when projected.

5. In a combination as set forth in claim 4 offset portions in the side members of the frame whereby the frame will snugly engage the grooves.

6. In a combination as set forth in claim 4, means on the frame for maintaining the grill in alignment with the stationary frame.

7. In a combination as set forth in claim 4, upstanding offset members on the parallel bars engaging the sides of the grill for maintaining the grill in alignment with the stationary frame.

COLON WM. GREENWALD.